US012693716B2

(12) United States Patent　　(10) Patent No.:　US 12,693,716 B2
Farkas et al.　　(45) Date of Patent:　Jul. 28, 2026

(54) CABLING SYSTEM FOR AN INFORMATION HANDLING SYSTEM

(71) Applicant: Dell Products L.P., Round Rock, TX (US)

(72) Inventors: Sandor Tibor Farkas, Round Rock, TX (US); Raymond Dewine Heistand, II, Round Rock, TX (US); Bhyrav M. Mutnury, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 18/397,527

(22) Filed: Dec. 27, 2023

(65) Prior Publication Data

US 2025/0216913 A1　　Jul. 3, 2025

(51) Int. Cl.
*G06F 1/00*　　(2006.01)
*G06F 1/16*　　(2006.01)

(52) U.S. Cl.
CPC .......... *G06F 1/1683* (2013.01); *G06F 1/1616* (2013.01)

(58) Field of Classification Search
CPC ............................ G06F 1/1683; G06F 1/1616
See application file for complete search history.

(56) References Cited

FOREIGN PATENT DOCUMENTS

| | | | |
|---|---|---|---|
| JP | 2013129352 | * 7/2013 | |
| WO | WO-2014130884 A2 * | 8/2014 | ............. A63G 31/00 |

* cited by examiner

*Primary Examiner* — Pete T Lee
(74) *Attorney, Agent, or Firm* — McDermott Will & Schulte LLP

(57) ABSTRACT

A cabling system, including a cable; and a preform having a first straight section, a second straight section, and a curved section positioned between the first and the second straight sections, the curved section including multiple varying curvatures, wherein the cable is coupled to the preform such that a portion of the cable coupled to the curved section includes the multiple varying curvatures.

17 Claims, 11 Drawing Sheets

200

Preform 222

Cable 220

Cabling System 210

Information Handling System 202

CABLING SYSTEM FOR AN INFORMATION HANDLING SYSTEM

BACKGROUND

Field of the Disclosure

The disclosure relates generally to an information handling system, and in particular, a cabling system for the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sharp bends in a cable of an information handling system can result in impedance drops in the bend area. In some cases, the impact of these bends can leave a hysteresis which will also show up when the cable bend is removed.

SUMMARY

Innovative aspects of the subject matter described in this specification may be embodied in a cabling system, including a cable; and a preform having a first straight section, a second straight section, and a curved section positioned between the first and the second straight sections, the curved section including multiple varying curvatures, wherein the cable is coupled to the preform such that a portion of the cable coupled to the curved section includes the multiple varying curvatures.

Other embodiments of these aspects include corresponding systems and apparatus.

These and other embodiments may each optionally include one or more of the following features. For instance, each curvature of the multiple varying curvatures is associated with a respective bend radius. The curved section includes a midpoint of curvature, the midpoint of curvature associated with a first bend radius less than the respective bend radii associated with the remaining curvatures of the curved section of the preform. The respective bend radii associated with the remaining curvatures of the curved section of the preform increase towards the first and the second straight sections. The curved section of the preform includes: a first curvature at the midpoint of curvature associated with the first bend radius; a second curvature spaced-apart a first distance from the midpoint of curvature along a first direction, the second curvature associated with a second bend radius; and a third curvature spaced-apart a second distance from the midpoint of curvature along a second direction, the third curvature associated with a third bend radius. The second bend radius is substantially the same as the third bend radius. The first distance is substantially the same as the second distance. The curved section of the preform further includes: a fourth curvature spaced-apart a third distance from the midpoint of curvature along the first direction, the fourth curvature associated with a fourth bend radius; and a fifth curvature spaced-apart a fourth distance from the midpoint of curvature along the second direction, the fifth curvature associated with a fifth bend radius. The fourth bend radius is substantially the same as the fifth bend radius, wherein the fourth bend radius and the fifth bend radius are both greater than both of the second bend radius and the third bend radius. The third distance is substantially the same as the fourth distance, wherein the third distance and the fourth distance are both greater than both of the first distance and the second distance. The cable is coupled to the preform such that the preform surrounds an entirety of the portion of the cable. The cable is coupled to the preform such that the preform partially surrounds the portion of the cable. The preform is a rigid shell. Further including tape surrounding the preform and the cable.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
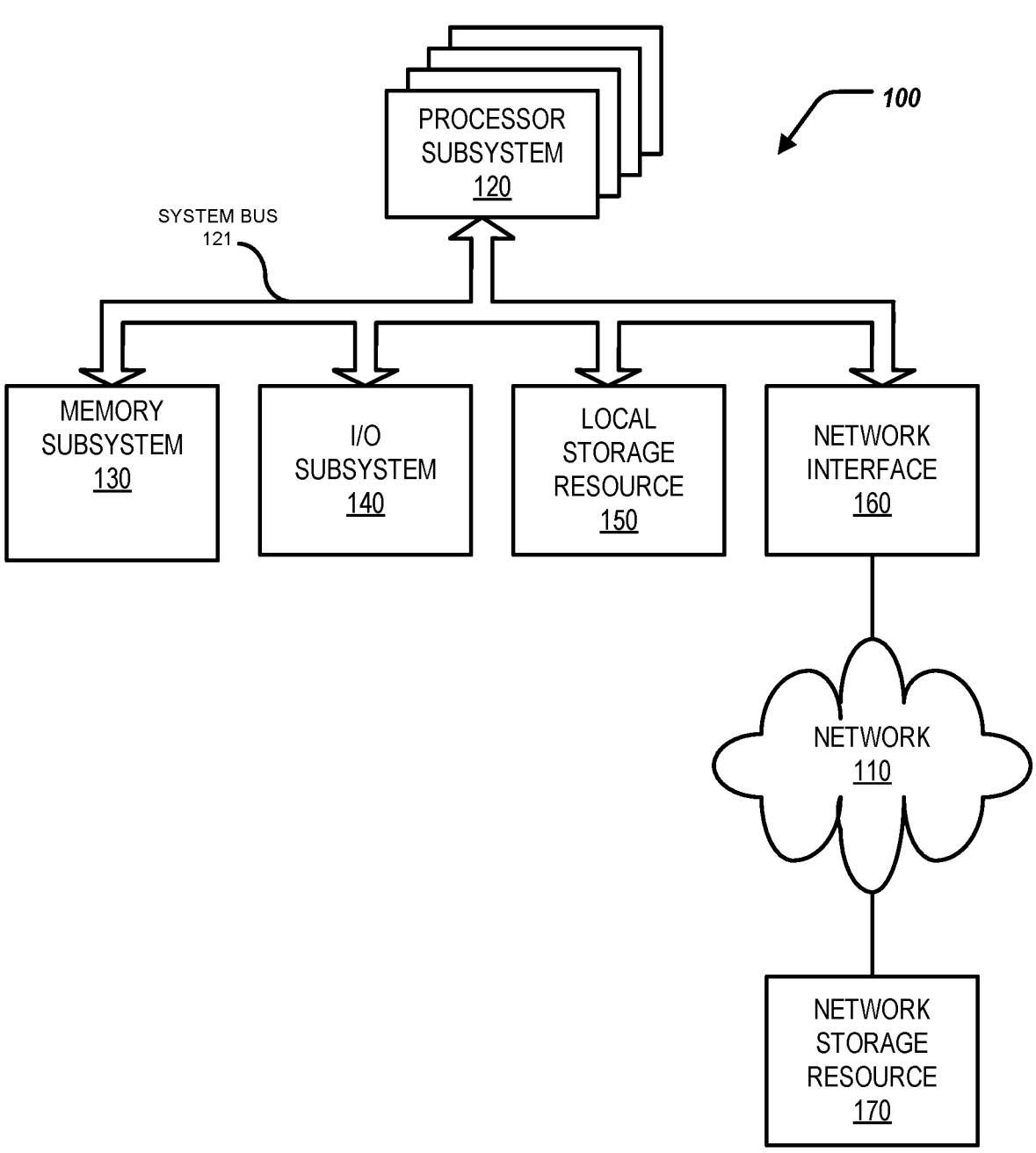
FIG. 1 is a block diagram of selected elements of an embodiment of an information handling system.

This disclosure discusses a cabling system for an information handling system. In short, a preform can facilitate bending and forming curvatures in a cable to facilitate routing of the cable (e.g., within the information handling system). The preform can form such curvatures in the cable to improve signal loss along the cable by having curvatures with varying radii, described further herein. Specifically, sharp bends of the cable can cause impedance drops and discontinuity, and signal reflections at the cable. The curvatures of the preform, including a curvature having the smallest radius of the curvatures of the preform in the midpoint of the preform and gradually increasing the curvature of the preform away from the midpoint can facilitate minimizing signal loss of the cable (when the cable is coupled to the preform) while achieving a desired mechanical routing of the cable within the information handling system.

Specifically, this disclosure discusses a cabling system, including a cable; and a preform having a first straight section, a second straight section, and a curved section positioned between the first and the second straight sections, the curved section including multiple varying curvatures, wherein the cable is coupled to the preform such that a portion of the cable coupled to the curved section includes the multiple varying curvatures.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
FIG. 2 illustrates a block diagram of an information handling system including a cabling system.
Figure 2:
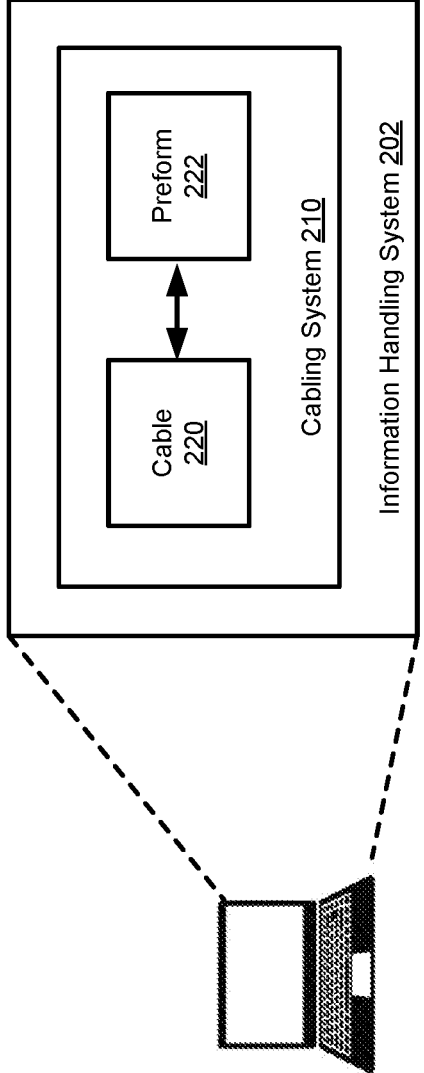

Turning to FIG. 2, FIG. 2 illustrates an environment 200 including an information handling system 202. The information handling system 202 can include a cabling system 210. The cabling system 210 can include a cable 220 and a preform 222. In some examples, the information handling system 202 is similar to, or includes, the information handling system 100 of FIG. 1.

Figure 3:
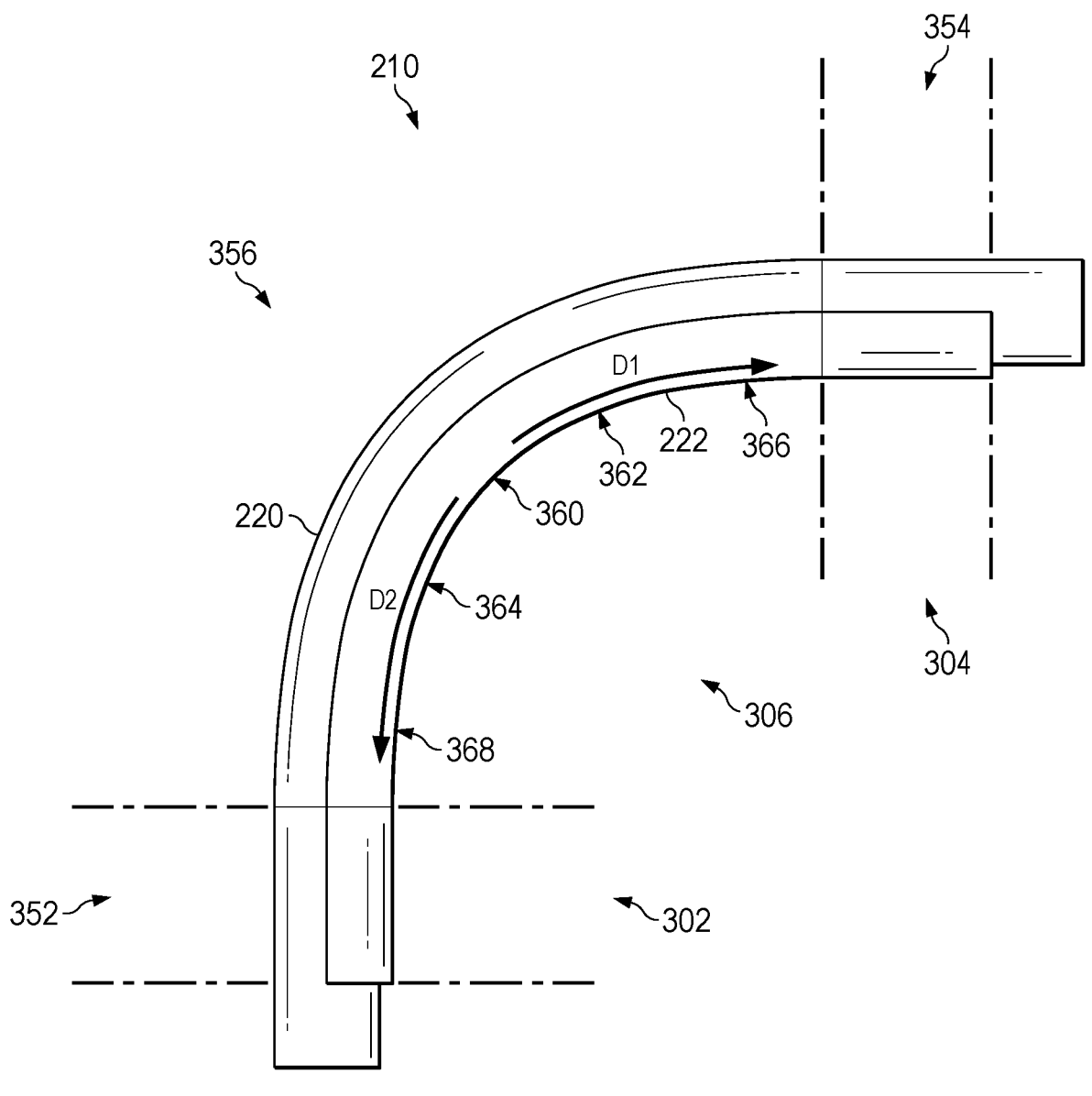
FIG. 3 illustrates a top down view of the cabling system, in a first implementation.

FIG. 3 illustrates the cabling system 210. Specifically, the cabling system 210 includes the cable 220 and the preform 222. The preform 222 can be a rigid shell. The preform 222 includes a first straight section 302, a second straight section 304, and a curved section 306. The curved section 306 can be positioned between the first straight section 302 and the second straight section 304. The cable 220 is coupled to the preform 222.

The curved section 306 can include multiple varying curvatures. Furthermore, as the cable 220 is coupled to the preform 222, a curved portion 356 of the cable 220 can be coupled to the curved section 306 of the preform 222. Additionally, as the cable 220 is coupled to the preform 222, a first straight section 352 can be coupled to the first straight section 302 of the preform 222; and a second straight section 354 can be coupled to the second straight section 304 of the preform 222. Thus, the curved portion 356 of the cable 220 includes the multiple varying curvatures as well. Specifically, the preform 222 can control the shape of the cable 220, and in particular, the shape or curvature of the cable 220 at the curved portion 356 of the cable 220.

In short, the preform 222 can facilitate bending and forming curvatures in the cable 220 to facilitate routing of the cable 220 (e.g., within the information handling system 202). The preform 222 can form such curvatures in the cable 220 to improve signal loss along the cable 220 by having curvatures with varying radii, described further herein.

To that end, each curvature of the preform 222 or the cable 220 of the multiple varying curvatures is associated with a respective bend radius. In some examples, the preform 222 or the cable 220 can have any number of curvatures each associated with a respective bend radius. That is, the preform 222 or the cable 220 can have any number of bend radii. In the illustrated example of FIG. 3, the curved section 306 can include a midpoint of curvature 360. The midpoint of curvature 360 can be associated with a first curvature and a first bend radius. In some examples, the first bend radius associated with the midpoint of curvature 360 is less than respective bend radii associated with the remaining curvatures of the curved section 306 of the preform 222. Specifically, the respective bend radii associated with the remaining curvatures of the curved section 306 of the preform 222 increase towards the first straight section 302 and the second straight section 304.

In particular, a second curvature 362 of the curved section 306 of the preform 222 is spaced-apart a first distance from the midpoint of curvature 360 along a first direction D1. The second curvature 362 of the curved section 306 is associated with a second bend radius. Furthermore, a third curvature 364 of the curved section 306 of the preform 222 is spaced-apart a second distance from the midpoint of curvature 360 along a second direction D2. The third curvature 364 of the curved section 306 is associated with a third bend radius. In some examples, the second bend radius of the second curvature 362 of the curved section 306 is substantially the same as the third bend radius of the third curvature 364 of the curved section 306. In some examples, the first bend radius of the midpoint of curvature 360 is less than both the second bend radius of the second curvature 362 and the third bend radius of the third curvature 364. In some examples, the first distance D1 is substantially the same as the second distance D2.

Additionally, a fourth curvature 366 of the curved section 306 of the preform 222 is spaced-apart a third distance from the midpoint of curvature 360 along the first direction D1. The fourth curvature 366 of the curved section 306 is associated with a fourth bend radius. Furthermore, a fifth curvature 368 of the curved section 306 of the preform 222 is spaced-apart a fourth distance from the midpoint of curvature 360 along the second direction D2. The fifth curvature 368 of the curved section 306 is associated with a fifth bend radius. In some examples, the fourth bend radius of the fourth curvature 366 of the curved section 306 is substantially the same as the fifth bend radius of the fifth curvature 368 of the curved section 306. In some examples, the fourth bend radius of the fourth curvature 366 and the fifth bend radius of the fifth curvature 368 are both greater than the second bend radius of the second curvature 362 and the third bend radius of the third curvature 364. In some examples, the first bend radius of the midpoint of curvature 360 is less than both the fourth bend radius of the fourth curvature 366 and the fifth bend radius of the fifth curvature 368. In some examples, the third distance is substantially the same as the fourth distance. In some examples, the third distance and the fourth distance are both greater than both of the first distance and the second distance.

Figure 4:
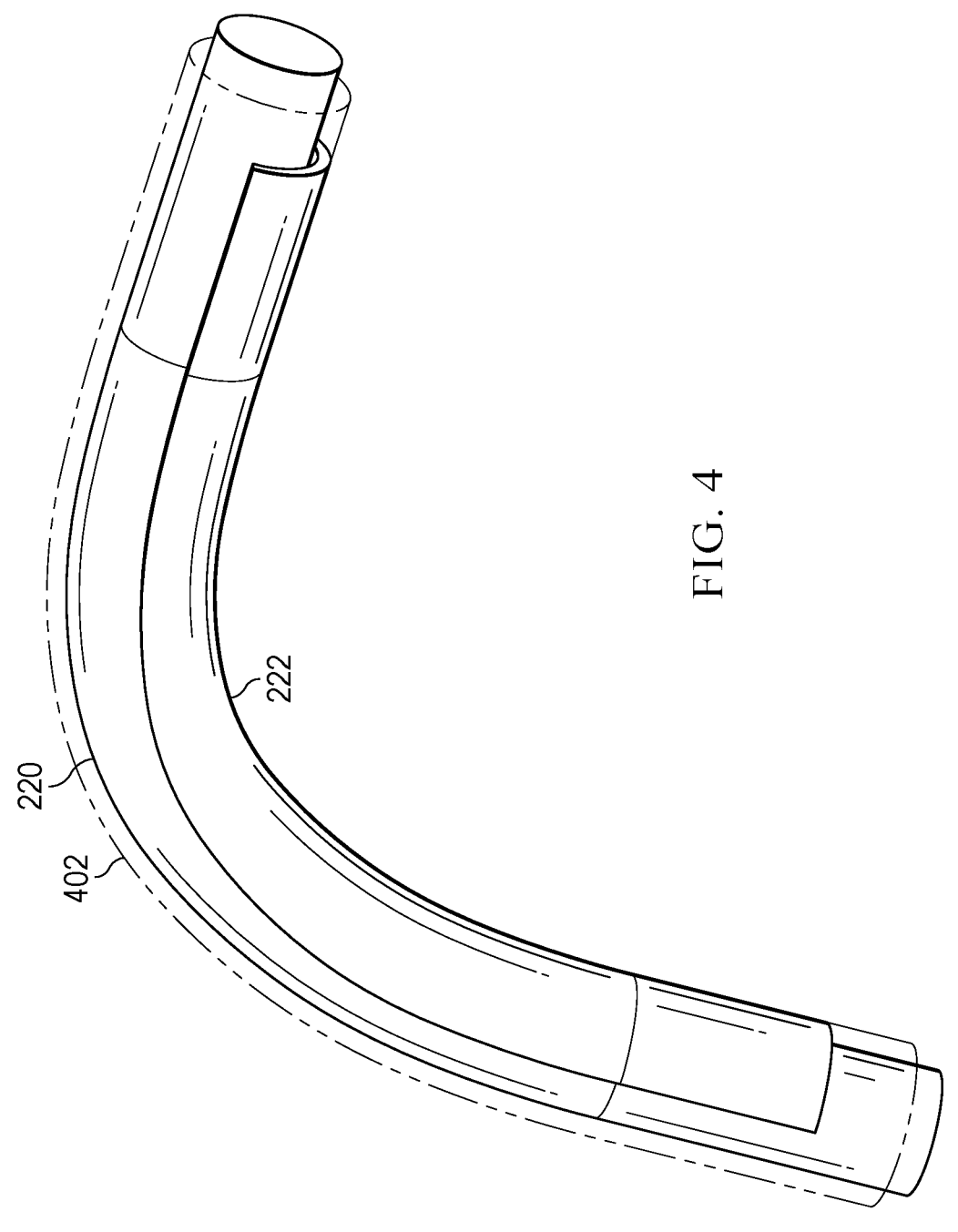
FIG. 4 illustrates a perspective view of the cabling system, in the first implementation.

In some examples, the cable 220 is coupled to the preform 222 such that the preform 222 substantially partially surrounds the curved portion 356 of the cable 220. In some examples, the cable 220 is coupled to the preform 222 such that the preform 222 surrounds an entirety of the curved portion 356 of the cable 220. Referring to FIG. 4, in some examples, the cabling system 210 can further include tape 402 that substantially surrounds the preform 222 and the cable 220.

Figure 5:
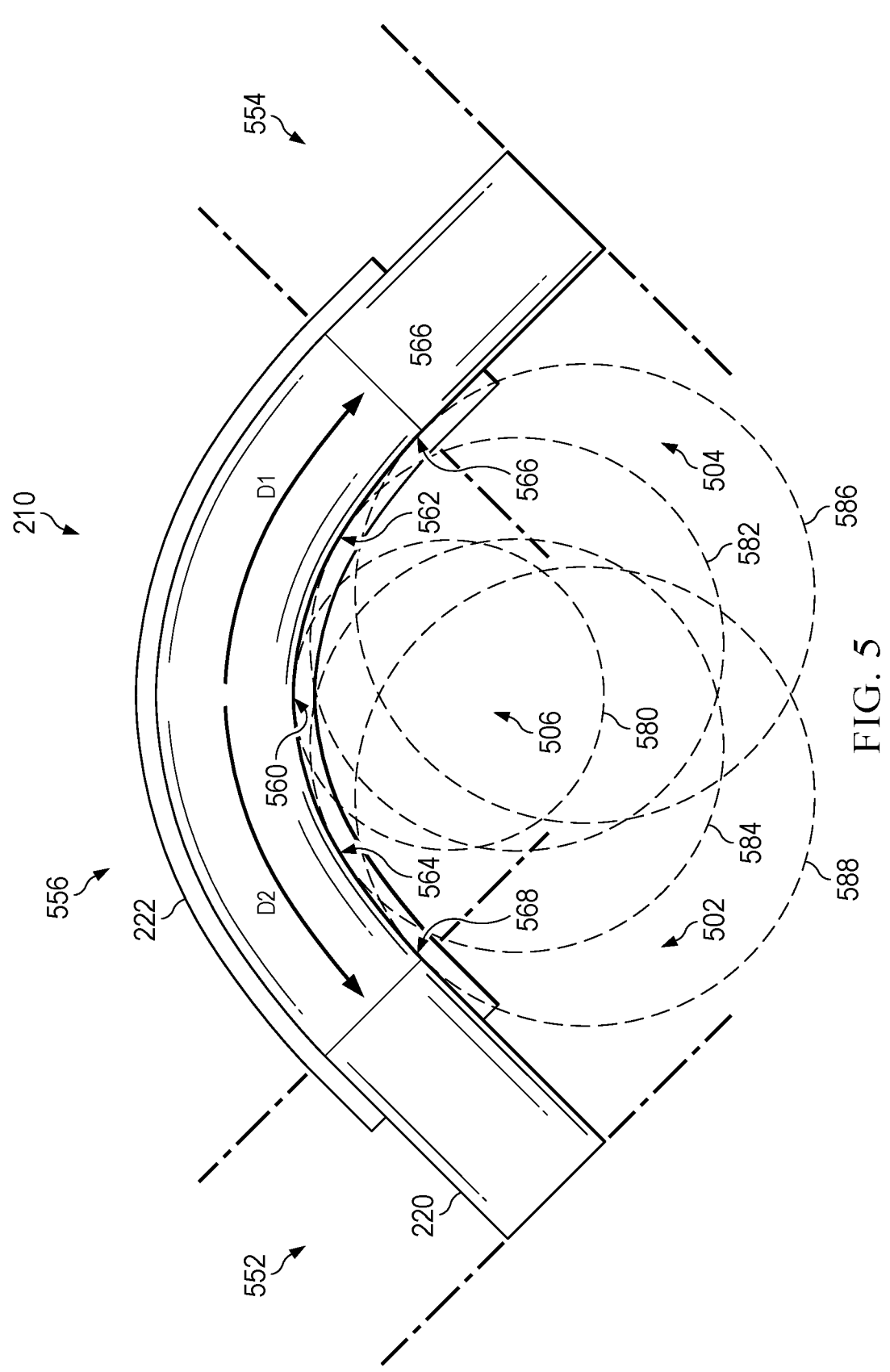
FIG. 5 illustrates a top down view of the cabling system, in a second implementation.

FIG. 5 illustrates the cabling system 210, in a further implementation. The preform 222 includes a first straight section 502, a second straight section 504, and a curved section 506. The curved section 506 can be positioned between the first straight section 502 and the second straight section 504.

The curved section 506 can include multiple varying curvatures. Furthermore, as the cable 220 is coupled to the preform 222, a curved portion 556 of the cable 220 can be coupled to the curved section 506 of the preform 222. Additionally, as the cable 220 is coupled to the preform 222, a first straight section 552 of the cable 220 can be coupled to the first straight section 502 of the preform 222; and a second straight section 554 of the cable 220 can be coupled to the second straight section 504 of the preform 222. Thus, the curved portion 556 of the cable 220 includes the multiple varying curvatures as well. Specifically, the preform 222 can control the shape of the cable 220, and in particular, the shape or curvature of the cable 220 at the curved portion 556 of the cable 220.

To that end, each curvature of the preform 222 or the cable 220 of the multiple varying curvatures is associated with their respective bend radius. In some examples, the preform 222 or the cable 220 can have any number of curvatures each associated with a respective bend radius. That is, the preform 222 or the cable 220 can have any number of bend radii. In the illustrated example of FIG. 5, the curved section 506 can include a midpoint of curvature 560. The midpoint of curvature 560 can be associated with a first curvature and a first bend radius. That is, the first curvature at the midpoint of curvature 560 is associated with a first bend radius associated with a first circle 580.

In some examples, the first bend radius associated with the midpoint of curvature 560 is less than respective bend radii associated with the remaining curvatures of the curved section 506 of the preform 222. Specifically, the respective bend radii associated with the remaining curvatures of the curved section 506 of the preform 222 increase towards the first straight section 602 and the second straight section 604.

In particular, a second curvature 562 of the curved section 506 of the preform 222 is spaced-apart a first distance from the midpoint of curvature 560 along a first direction D1. The second curvature 562 of the curved section 506 is associated with a second bend radius. That is, the second curvature 562 associated with the second bend radius is associated with a second circle 582. Furthermore, a third curvature 564 of the curved section 506 of the preform 222 is spaced-apart a second distance from the midpoint of curvature 560 along a second direction D2. The third curvature 564 of the curved section 506 is associated with a third bend radius. That is, the third curvature 564 associated with the third bend radius is associated with a third circle 584. In some examples, the second bend radius of the second curvature 562 of the curved section 506 is substantially the same as the third bend radius of the third curvature 564 of the curved section 506. In some examples, the first bend radius of the midpoint of curvature 560 is less than both the second bend radius of the second curvature 562 and the third bend radius of the third curvature 564. In some examples, the first distance D1 is substantially the same as the second distance D2.

Additionally, a fourth curvature 566 of the curved section 506 of the preform 222 is spaced-apart a third distance from the midpoint of curvature 560 along the first direction D1. The fourth curvature 566 of the curved section 506 is associated with a fourth bend radius. That is, the fourth curvature 566 associated with the fourth bend radius is associated with a fourth circle 586. Furthermore, a fifth curvature 568 of the curved section 506 of the preform 222 is spaced-apart a fourth distance from the midpoint of curvature 560 along the second direction D2. The fifth curvature 568 of the curved section 506 is associated with a fifth bend radius. That is, the fifth curvature 568 associated with the fifth bend radius is associated with a fifth circle 588.

In some examples, the fourth bend radius of the fourth curvature 566 of the curved section 506 is substantially the same as the fifth bend radius of the fifth curvature 568 of the curved section 506. In some examples, the fourth bend radius of the fourth curvature 566 and the fifth bend radius of the fifth curvature 568 are both greater than the second bend radius of the second curvature 562 and the third bend radius of the third curvature 564. In some examples, the first bend radius of the midpoint of curvature 560 is less than both the fourth bend radius of the fourth curvature 566 and the fifth bend radius of the fifth curvature 568. In some examples, the third distance is substantially the same as the fourth distance. In some examples, the third distance and the fourth distance are both greater than both of the first distance and the second distance.

Figure 6A:
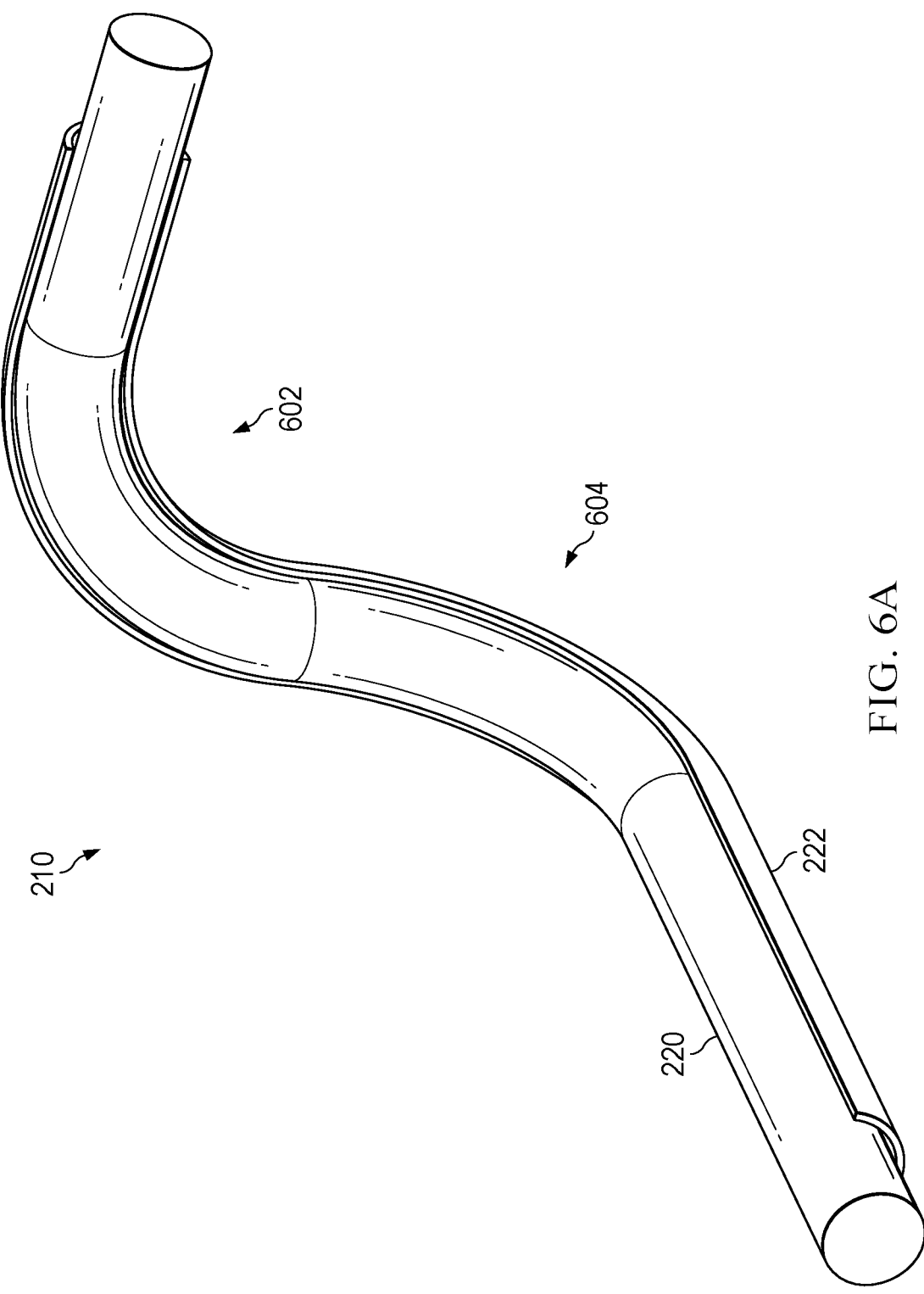
FIGS. 6A, 6B illustrate the cabling system, in a further implementation.
Figure 6B:
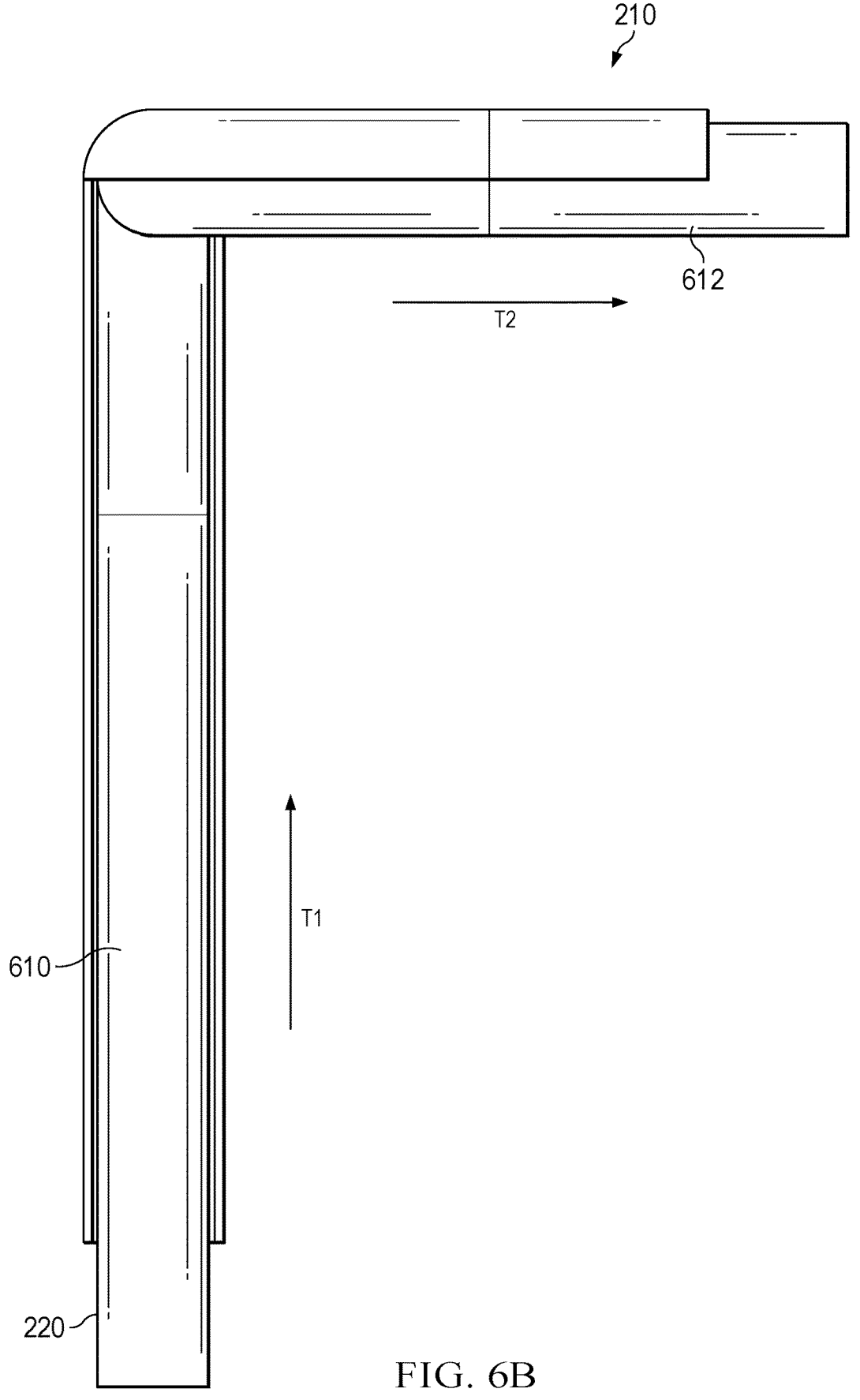

FIGS. 6A, 6B illustrate the cabling system 210, in a further implementation. Specifically, referring to FIG. 6A, the preform 222 can include two (or more) curved sections 602, 604 similar to the curved sections 306 and 506 of FIGS. 3 and 5, respectively. The curved sections 602, 604 can lay in differing planes and orientations such that a desired layout of the cable 220 is obtained. For example, as shown in FIG. 6B, a portion 610 of the cable 220 extends in a first direction T1 and is routed by the preform 222 approximately 90 degrees and such a portion 612 of the cable 220 also extends in a second direction T2, orthogonal to the first direction T1. Additionally, the portion 610 of the cable 220 can be spaced apart from the portion 612 of the cable 222.

Figure 7A:
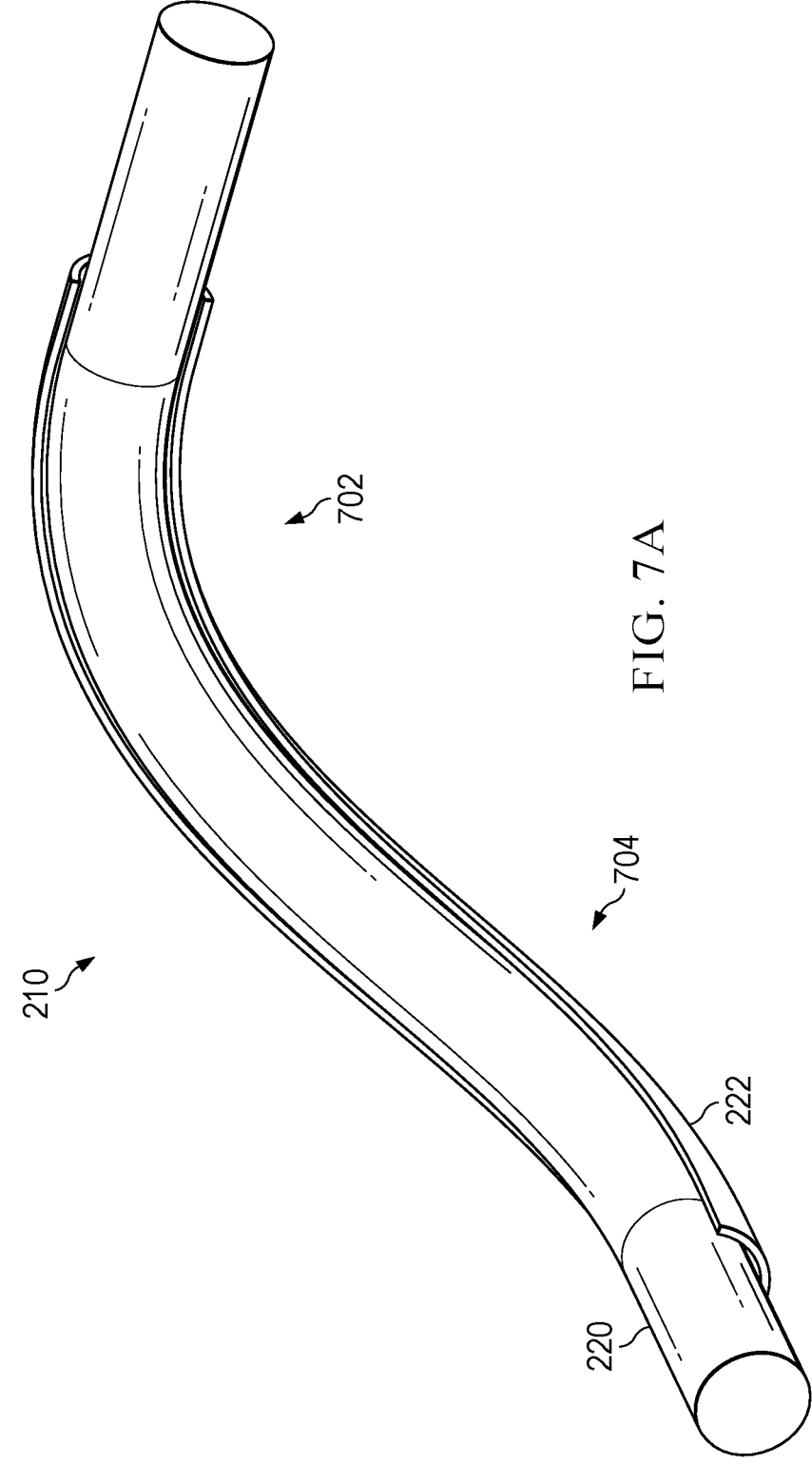
FIGS. 7A, 7B illustrate the cabling system, in a further implementation.
Figure 7B:
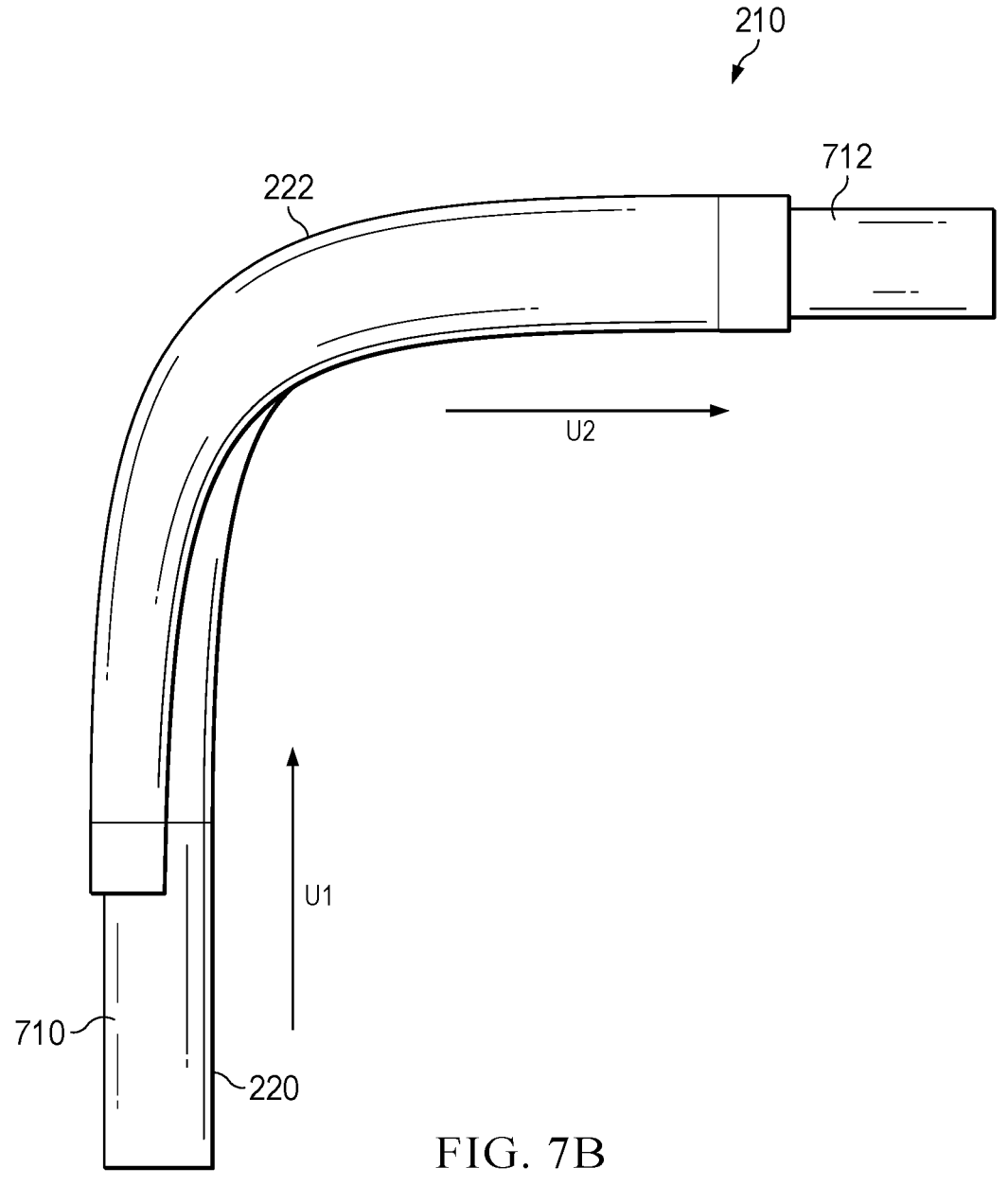

FIGS. 7A, 7B illustrate the cabling system 210, in a further implementation. Specifically, referring to FIG. 7A, the preform 222 can include two (or more) curved sections 702, 704 similar to the curved sections 306 and 506 of FIGS. 3 and 5, respectively. The curved sections 702, 704 can lay in differing planes and orientations such that a desired layout of the cable 220 is obtained. For example, as shown in FIG. 7B, a portion 710 of the cable 720 extends in a first direction U1 and is routed by the preform 222 approximately 90 degrees and such a portion 712 of the cable 220 also extends in a second direction U2, orthogonal to the first direction U1. Additionally, the portion 710 of the cable 220 can be spaced apart from the portion 712 of the cable 222.

Figure 8A:
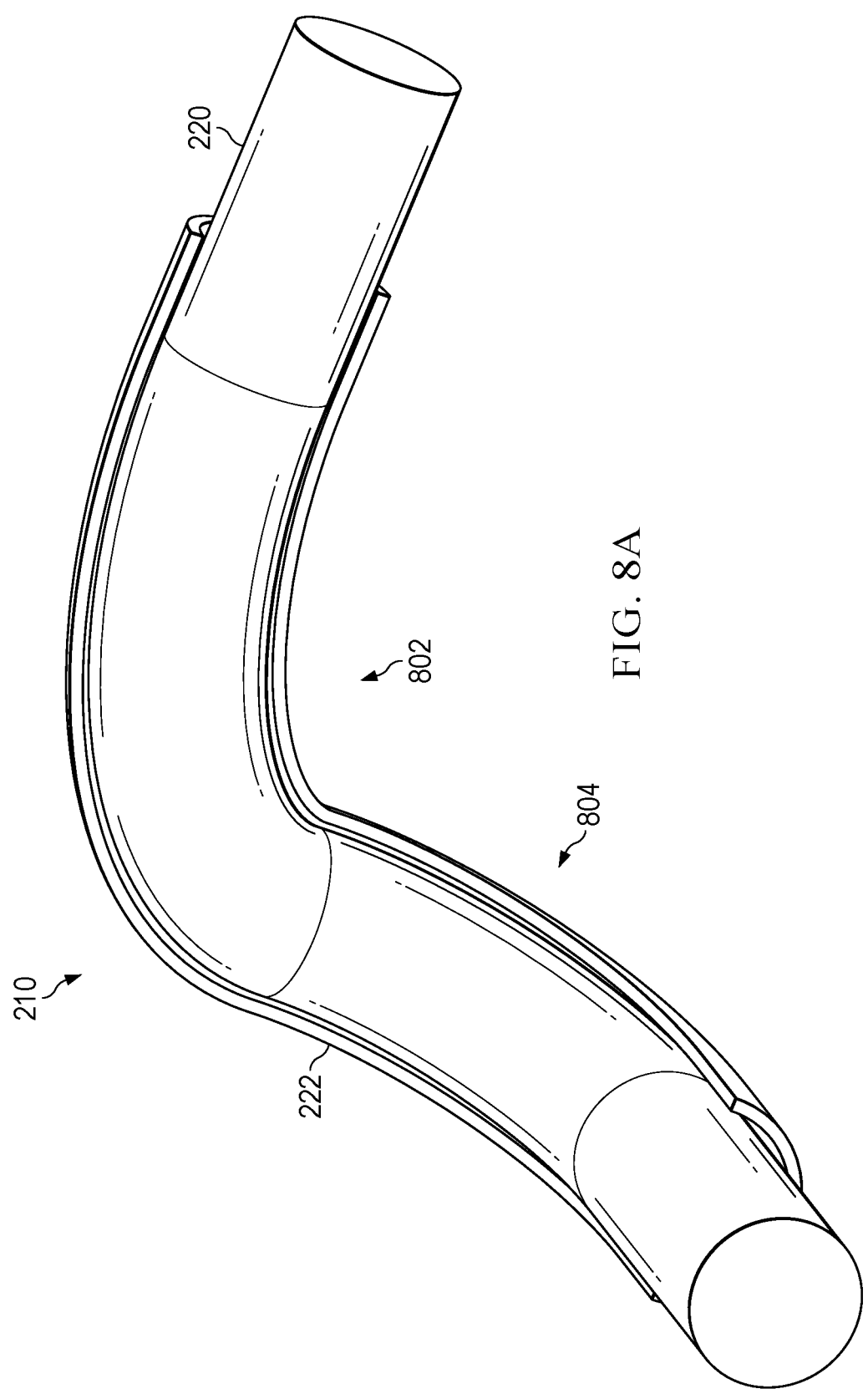
FIGS. 8A, 8B illustrate the cabling system, in a further implementation.
Figure 8B:
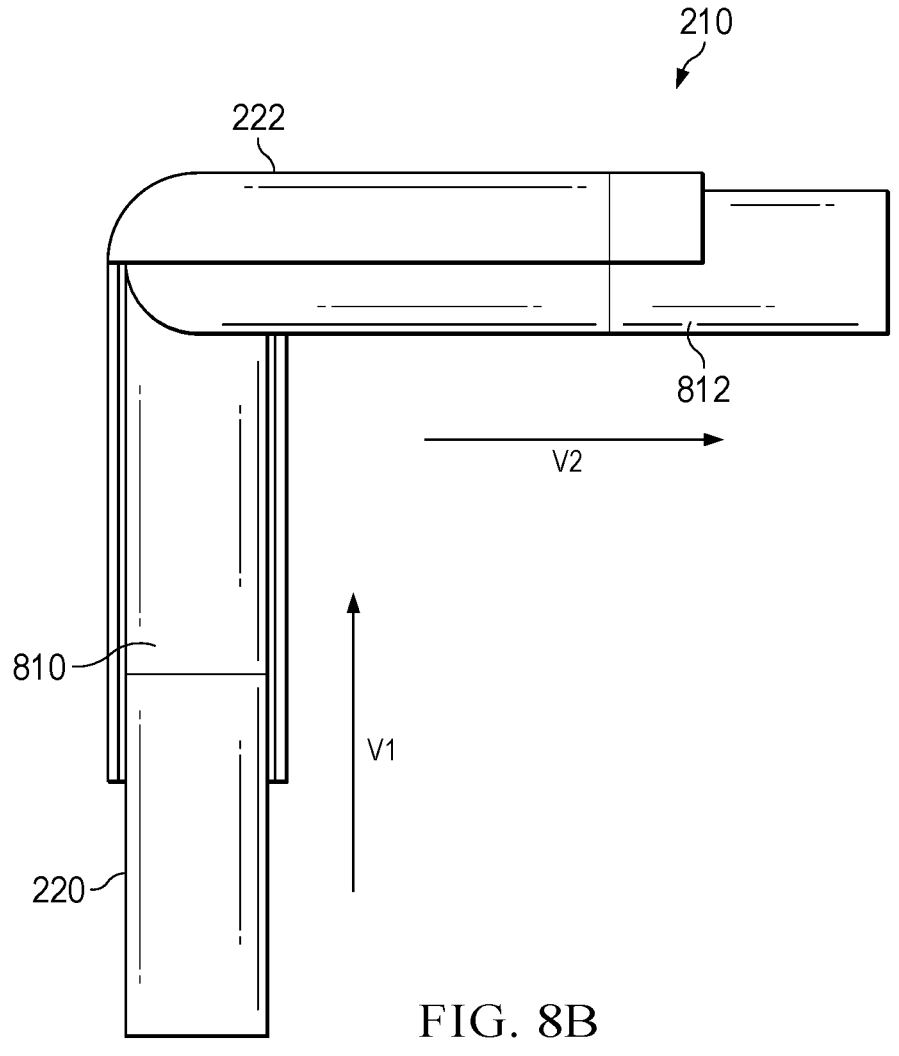

FIGS. 8A, 8B illustrate the cabling system 210, in a further implementation. Specifically, referring to FIG. 8A, the preform 222 can include two (or more) curved sections 802, 804 similar to the curved sections 306 and 506 of FIGS. 3 and 5, respectively. The curved sections 802, 804 can lay in differing planes and orientations such that a desired layout of the cable 220 is obtained. For example, as shown in FIG. 8B, a portion 810 of the cable 820 extends in a first direction V1 and is routed by the preform 222 approximately 90 degrees and such a portion 812 of the cable 220 also extends in a second direction V2, orthogonal to the first direction V1. Additionally, the portion 810 of the cable 220 can be spaced apart from the portion 812 of the cable 222.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A cabling system, comprising:
   a cable; and a preform having a first straight section, a second straight section, and a curved section positioned between the first and the second straight sections, the curved section including multiple varying curvatures,
   wherein the cable is coupled to the preform such that a portion of the cable coupled to the curved section includes the multiple varying curvatures,
   wherein each curvature differs in bend radius from the respective bend radius of each other curvature of the multiple varying curvatures,
   wherein the curved section includes a midpoint of curvature, the midpoint of curvature associated with a first bend radius less than the respective bend radii associated with the remaining curvatures of the curved section of the preform.

2. The cabling system of claim 1, wherein each curvature of the multiple varying curvatures is associated with a respective bend radius.

3. The cabling system of claim 1, wherein the respective bend radii associated with the remaining curvatures of the curved section of the preform increase towards the first and the second straight sections.

4. The cabling system of claim 3, wherein the curved section of the preform includes:
   a first curvature at the midpoint of curvature associated with the first bend radius;
   a second curvature spaced-apart a first distance from the midpoint of curvature along a first direction, the second curvature associated with a second bend radius; and
   a third curvature spaced-apart a second distance from the midpoint of curvature along a second direction, the third curvature associated with a third bend radius.

5. The cabling system of claim 4, wherein the second bend radius is substantially the same as the third bend radius.

6. The cabling system of claim 5, wherein the first distance is substantially the same as the second distance.

7. The cabling system of claim 6, wherein the curved section of the preform further includes:
   a fourth curvature spaced-apart a third distance from the midpoint of curvature along the first direction, the fourth curvature associated with a fourth bend radius; and
   a fifth curvature spaced-apart a fourth distance from the midpoint of curvature along the second direction, the fifth curvature associated with a fifth bend radius.

8. The cabling system of claim 7, wherein the fourth bend radius is substantially the same as the fifth bend radius, wherein the fourth bend radius and the fifth bend radius are both greater than both of the second bend radius and the third bend radius.

9. The cabling system of claim 8, wherein the third distance is substantially the same as the fourth distance, wherein the third distance and the fourth distance are both greater than both of the first distance and the second distance.

10. The cabling system of claim 1, wherein the cable is coupled to the preform such that the preform surrounds an entirety of the portion of the cable.

11. The cabling system of claim 1, wherein the cable is coupled to the preform such that the preform partially surrounds the portion of the cable.

12. The cabling system of claim 1, wherein the preform is a rigid shell.

13. An information handling system, comprising:
   a processor;
   memory media storing instructions executable by the processor to perform operations;

a cable system, including:

a cable; and a preform having a first straight section, a second straight section, and a curved section positioned between the first and the second straight sections, the curved section including multiple varying curvatures, wherein the cable is coupled to the preform such that a portion of the cable coupled to the curved section includes the multiple varying curvatures, wherein each curvature differs in bend radius from the respective bend radius of each other curvature of the multiple varying curvatures, wherein the curved section includes a midpoint of curvature, the midpoint of curvature associated with a first bend radius less than the respective bend radii associated with the remaining curvatures of the curved section of the preform.

14. The information handling system of claim 13, wherein each curvature of the multiple varying curvatures is associated with a respective bend radius.

15. The information handling system of claim 13, wherein the respective bend radii associated with the remaining curvatures of the curved section of the preform increase towards the first and the second straight sections.

16. The information handling system of claim 15, wherein the curved section of the preform includes:

a first curvature at the midpoint of curvature associated with the first bend radius;

a second curvature spaced-apart a first distance from the midpoint of curvature along a first direction, the second curvature associated with a second bend radius; and a third curvature spaced-apart a second distance from the midpoint of curvature along a second direction, the third curvature associated with a third bend radius.

17. The information handling system of claim 16, wherein the second bend radius is substantially the same as the third bend radius.

\* \* \* \* \*